R. LIEBAU.
HYDROPNEUMATIC DEVICE.
APPLICATION FILED SEPT. 18, 1915. RENEWED FEB. 19, 1920.
1,340,233.
Patented May 18, 1920.
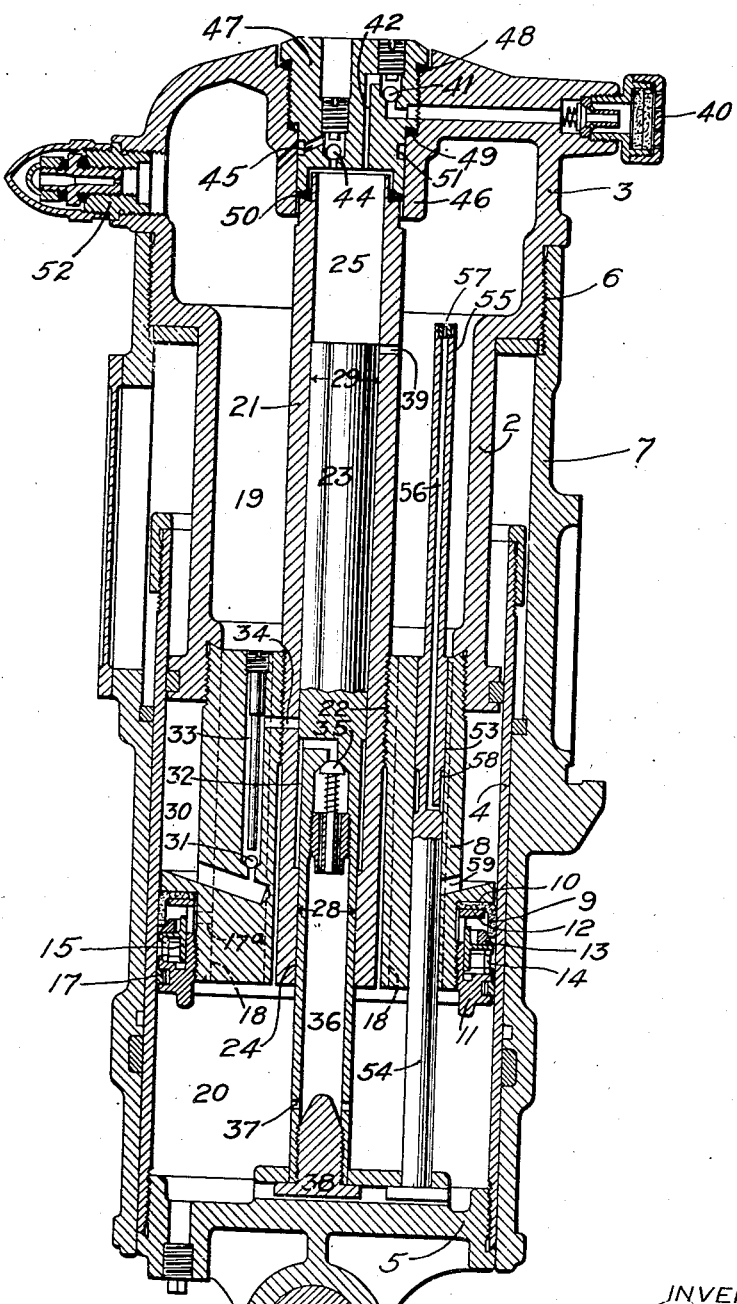

UNITED STATES PATENT OFFICE.

RICHARD LIEBAU, OF NEW HAVEN, CONNECTICUT, ASSIGNOR TO THE WESTINGHOUSE AIR SPRING COMPANY, A CORPORATION OF PENNSYLVANIA.

HYDROPNEUMATIC DEVICE.

1,340,233. Specification of Letters Patent. Patented May 18, 1920.

Application filed September 18, 1915, Serial No. 51,472. Renewed February 19, 1920. Serial No. 359,854.

*To all whom it may concern:*

Be it known that I, RICHARD LIEBAU, a citizen of the United States, and a resident of New Haven, in the county of New Haven and State of Connecticut, have made a new and useful Invention in Hydropneumatic Devices, of which the following is a specification.

This invention relates to hydropneumatic devices of the type set forth in several applications for patents filed by me and in Letters Patent No. 1,036,043, issued to George Westinghouse on August 20, 1912.

In the present application, as in the former applications and patent, the invention is embodied in a fluid-compression device adapted for use as a compression spring broadly applicable in any relation where two bodies are so associated that resilient support of one is desirable, and the general object in view in this, as in said former applications and patent, has been to embody the principle of resilient support by an elastic compression medium such as air, or gas in a commercially practical, self-contained, air-tight compression device adapted to serve all of the purposes and functions of a spring.

My present invention also resembles that of the said former applications and patent in so far as a fluid-tight joint between the sliding surfaces of the device is maintained by means of a liquid bath.

According to the present invention, which is broadly applicable for use as a spring for motor vehicles such as automobiles, (and which hereinafter without any idea of limiting the invention will be referred to as an air spring), means are provided for forcing air into the compression chamber of the spring, for automatically determining the normal or operative relative positions of the relatively movable members of the spring irrespective of the load carried therby and for transferring the sealing liquid forming the bath for the sliding joint from a collecting chamber on the low pressure side of the sliding joint to the compression chamber.

The drawing is a sectional elevation of an air spring embodying this invention.

In the device the cushion or compression chamber is made up of a cylinder 2, provided with a head 3, formed integrally therewith and which telescopes within a cylinder 4, having a bottom 5 threaded thereinto. Secured to head 3 at 6 is an outer cylinder 7, which serves as a cover or mud or dust guard and a guide for cylinder 4.

Threaded to the lower end of cylinder 2 is a plunger head 8, which carries a cup leather packing 9 for the telescoping or sliding joint between the cylinders 2 and 4. A seat 10 is formed for the cup leather packing, and said packing is firmly held to said seat by means of a nut 11 threaded to the lower end of the plunger head and which is provided with an upright extension 12 which clamps the cup leather to its seat 10.

A cone expander ring 13 is pressed against the inner depending lip of the cup leather packing by means of a spring 14, which presses against an intermediate sliding and centering member 15, interposed between the cone expander ring and the spring. This member 15 slides on the extension of the nut 11 and allows the expander ring to movably center on the depending lip of the cup leather packing.

A spring-backed leather wiper ring 17 bears against the inner surface of cylinder 4 and serves to retain oil or other sealing liquid in the chamber which contains the cup leather packing.

The depending flange of the cup leather packing bears against the inner surface of cylinder 4 and the chamber containing the packing is in open communication by means of a duct 17$^a$ with one of the passages 18. These passages 18, shown by dotted lines, are formed in the plunger head and extend therethrough, from the space 19 above the plunger head to the space 20 below the same and serve as transfer passages for the liquid within the compression chamber during the compression and extension movements of the air spring.

At its center the plunger head is provided with a tubular extension 21 which is threaded into the plunger head at 22, and which serves as a pump cylinder for plunger 23. This pump cylinder is bored out so as to provide plunger chambers 24 and 25 of different diameters.

The pump plunger 23 having two diameters 28 and 29, snugly fits within the bores of the pump cylinder and the portion of larger diameter acts as the plunger of an air pump for drawing air from the atmosphere and forcing it into the compression chamber of the spring, while the portion of smaller diameter serves as the plunger of an oil pump for transferring oil from collecting chamber 30 on the low pressure side of cup leather packing to the compression chamber on the high pressure side of the cup leather packing.

The collecting chamber 30 formed on the low pressure side of the cup leather packing collects the oil which passes the packing and delivers it through check valve 31 to oil pump chamber 32 through passages 33 and 34, and from the pump chamber it is forced through check valve 35 to the compression chamber through passages 36 and 37.

Plunger 23 carries a bottom member 38, which slidably fits within a T groove or slot formed in the bottom member 5 and the plunger is positively moved during the compression and extension movements of the spring.

Upon the compression movements of the air spring a partial vacuum will be created in the oil pump chamber and when the port 34 is passed by the lower end of the larger portion of plunger 23, the oil from the collecting chamber 30 will be drawn into the pump chamber, from which upon the extension movements of the spring, it will be forced through check valve 35.

During the compression and extension movements of the spring so long as the top of plunger 23 does not pass below port 39 in the pump cylinder, the air pump will be effective for drawing in air through strainer 40, check valve 41 and passage 42, and will discharge the same through check valve 44 and passage 45 to the compression chamber of the air spring.

During the compression and extension movements of the air spring when the top of the air pump plunger operates below the port 39, the air pump will be ineffective and air will be merely drawn in through this port from the compression chamber of the spring and forced out into said compression chamber.

Threaded within a central depending boss 46 of head 3 is a plug 47. This plug is concentric with tubular extension 21 of the plunger head and is packed against leakage by means of soft packings 48, 49 and 50. The outer cylindrical surface of the plug is provided with an annular groove 51, which registers with air channel 45.

A filling plug 52 is threaded into the side of head 3 and is adapted to be provided with an air valve, such as an ordinary tire valve, whereby the requisite amount of air may be pumped into the compression chamber of the spring before starting. The sealing liquid may be introduced into the compression chamber of the spring through charging plug 52.

The plunger head is drilled through from top to bottom between two of the through channels 18 to form a guide passage 53 for a pilot valve. This pilot valve consists of a plunger 54, which engages the same T slot as the bottom 38 of the oil and air pump plunger, and the pilot valve is adapted to regulate the normal or operative positions of the relatively movable members irrespective of the load to which the spring is subjected.

The plunger 54 of the pilot valve is reduced at its upper end as shown at 55, and is provided with a central opening or channel 56, which places the compression chamber through a restricted orifice 57 in communication with an annular groove 58 formed on the larger portion of the plunger 54. This annular groove is adapted at times to register with a port 59 which leads from the collecting chamber 30 to the bore for plunger 54.

If the air spring has accumulated a pressure within the compression chamber by means of the air pump sufficient to carry a certain load and this load is removed, the spring will extend, and if the extension is sufficient, annular chamber 58 will register with channel 59 and sufficient pressure will be relieved through the pilot valve to bring the relatively movable member to normal or operative position. The restricted orifice 57 is provided so that when the spring is working its full range (for instance when the vehicle upon which it is used is traveling over rough roads) the occasional register of groove 58 with port 59 will not result in too great a loss of pressure.

Having described what I now believe to be the preferred embodiment of my invention, I desire it to be understood that the device shown is only illustrative, and that various changes, modifications, additions and omissions may be made in the apparatus illustrated, without departing from the spirit and scope of my invention, as set forth by the appended claims.

What I claim is:

1. In a telescopic air spring having a sliding joint adapted to be sealed with liquid, a collector on the low pressure side of said joint for leaked liquid, a pump within the spring for charging the same with air, and a bleeder device for exhausting air from said spring to said collector; the operation of said bleeder device being dependent upon the relative positions of the telescoping members.

2. An air spring comprising telescoping members, forming a chamber having a sliding joint, a packing for said joint, a pump within the spring for charging said chamber with air under pressure, and a bleeder device for discharging air from said chamber to the low pressure side of said packing, the operation of said bleeder device being dependent upon the relative positions of said members and independent of the load on the spring or the pressure within said chamber.

3. An air spring comprising telescoping members forming a chamber, a packing for the joint between said members, a pump within the spring for charging said chamber with air, means independent of the load carried by the spring for rendering said pump at times ineffective as a pump, and a bleeder device for discharging air from said chamber to the low pressure side of said packing.

4. An air spring comprising telescoping members forming a chamber, a packing for the joint between said members, a pump concentrically located within said chamber for charging said chamber with air, and a bleeder device located eccentrically of said chamber for exhausting air therefrom and having an outlet to the low pressure side of said packing.

5. In an air spring, relatively movable members forming a cushion chamber and having a sliding joint adapted to be sealed with liquid, a pump within the spring for removing liquid from said joint and transferring it to the cushion chamber, a second pump within the spring for charging said chamber with air, and a bleeder device independent of said pumps for automatically discharging air from said chamber.

6. In an air spring, relatively movable members forming an extensible cushion chamber having a sliding joint, a pump within the spring for charging said chamber with air under pressure, a second pump within said spring adapted to discharge into said chamber and having its intake connected with said sliding joint, and a bleeder device the operation of which is dependent upon the relative positions of said members for exhausting air from said chamber.

7. In an air spring, members forming an extensible cushion chamber having a sliding joint, a collecting chamber connecting with said sliding joint, a pump arranged to discharge into said cushion chamber and having its intake in connection with said collecting chamber, a second pump for forcing air into said cushion chamber, and a bleeder device dependent upon the relative positions of said members for automatically bleeding air from said cushion chamber to said collecting chamber.

8. In an air spring, members forming an extensible cushion chamber having a sliding joint, a pump for automatically removing liquid from said joint and returning it to said chamber, a second pump within said spring for forcing air into said chamber, said second pump constructed to become inoperative upon extension of said spring beyond a determined point, and a bleeder device within said spring for automatically discharging air from said chamber.

In testimony whereof, I have hereunto subscribed my name this 16th day of September, 1915.

RICHARD LIEBAU.